(12) United States Patent
Meredith et al.

(10) Patent No.: US 12,323,856 B2
(45) Date of Patent: Jun. 3, 2025

(54) MACHINE LEARNING BETWEEN RADIO LOADING AND USER EXPERIENCE

(71) Applicants: AT&T Intellectual Property I, L.P., Atlanta, GA (US); AT&T Mobility II LLC, Atlanta, GA (US)

(72) Inventors: Sheldon Meredith, Roswell, GA (US); Zachary Meredith, Roswell, GA (US); Thomas Kiernan, Plano, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 421 days.

(21) Appl. No.: 17/682,974

(22) Filed: Feb. 28, 2022

(65) Prior Publication Data

US 2022/0279386 A1   Sep. 1, 2022

Related U.S. Application Data

(63) Continuation of application No. 16/939,804, filed on Jul. 27, 2020, now Pat. No. 11,272,402, which is a continuation of application No. 16/210,518, filed on Dec. 5, 2018, now Pat. No. 10,764,786.

(51) Int. Cl.
| | |
|---|---|
| *H04W 28/16* | (2009.01) |
| *G06N 20/00* | (2019.01) |
| *H04L 1/08* | (2006.01) |
| *H04W 24/02* | (2009.01) |
| *H04W 24/08* | (2009.01) |

(52) U.S. Cl.
CPC ............ *H04W 28/16* (2013.01); *G06N 20/00* (2019.01); *H04L 1/08* (2013.01); *H04W 24/02* (2013.01); *H04W 24/08* (2013.01)

(58) Field of Classification Search
CPC ..... H04W 28/16; H04W 24/02; H04W 24/08; H04W 72/542; G06N 20/00; H04L 1/08; G06F 9/5072
See application file for complete search history.

(56) References Cited

U.S. PATENT DOCUMENTS

| | | | |
|---|---|---|---|
| 9,642,146 | B2 | 5/2017 | Zhang et al. |
| 9,894,215 | B1 | 2/2018 | Bolton et al. |
| 9,935,694 | B2 | 4/2018 | Shan |

(Continued)

*Primary Examiner* — Vinncelas Louis
(74) *Attorney, Agent, or Firm* — Guntin & Gust, PLC; Ralph Trementozzi

(57) ABSTRACT

A resource upgrade predictor can be operable to receive, from a first network node device, traffic information. Based on the traffic information, the resource upgrade predictor can obtain network utilization data related to other network node devices having a similar interference characteristic to the first network node device. The resource upgrade predictor can use this network utilization data to determine a demand at which at least a defined value related to a transmission link capacity associated with transmissions between the first network node device and the user equipment, is attained. The resource upgrade predictor can also obtain projected demand data associated with a geographic area serviced by the first network node device, and determine, based upon the demand and the projected demand data, a time at which a network resource upgrade related to the first network node device, is to be performed.

20 Claims, 10 Drawing Sheets

(56) References Cited

U.S. PATENT DOCUMENTS

| | | |
|---|---|---|
| 9,980,177 B2 | 5/2018 | Austin et al. |
| 10,009,730 B2 | 6/2018 | Donovan et al. |
| 10,070,362 B2 | 9/2018 | Kwan |
| 10,362,166 B2 | 7/2019 | Tran et al. |
| 10,462,801 B2 | 10/2019 | Nammi et al. |
| 10,764,786 B2 | 9/2020 | Meredith et al. |
| 2013/0205027 A1* | 8/2013 | Abuelsaad ............ G06F 9/5072 709/226 |
| 2017/0127427 A1* | 5/2017 | Claridge ............. H04W 72/542 |
| 2017/0202000 A1 | 7/2017 | Fu et al. |
| 2017/0359752 A1 | 12/2017 | Yousefi'Zadeh et al. |
| 2018/0034580 A1 | 2/2018 | Rost |
| 2018/0139261 A1 | 5/2018 | Sintorn et al. |
| 2021/0127256 A1 | 4/2021 | Li et al. |
| 2021/0160798 A1 | 5/2021 | Zheng et al. |

\* cited by examiner

MACHINE LEARNING BETWEEN RADIO LOADING AND USER EXPERIENCE

RELATED APPLICATIONS

The subject patent application is a continuation of, and claims priority to each of, U.S. patent application Ser. No. 16/939,804, filed Jul. 27, 2020, and entitled "MACHINE LEARNING BETWEEN RADIO LOADING AND USER EXPERIENCE," which is a continuation of U.S. patent application Ser. No. 16/210,518 (now U.S. Pat. No. 10,764, 786), filed Dec. 5, 2018, and entitled "MACHINE LEARNING BETWEEN RADIO LOADING AND USER EXPERIENCE," the entireties of which applications are hereby incorporated by reference herein.

TECHNICAL FIELD

The present application relates generally to cellular network technology, and more specifically, to machine learning used to predict resource upgrade times based on radio loading and user experience (e.g., demand).

BACKGROUND

Radio technologies in cellular communications have grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including Long Term Evolution (LTE) and variants of LTE). The amount of traffic in cellular networks has experienced a tremendous amount of growth and expansion, and there are no indications that such growth will decelerate. It is expected that this growth will include use of the network not only by humans, but also by an increasing number of machines that communicate with each other, for example, surveillance cameras, smart electrical grids, sensors, home appliances and other technologies in connected homes, and intelligent transportation systems (e.g., the Internet of Things (IOT)). Additional technological growth includes 4K video, augmented reality, cloud computing, industrial automation, and vehicle to vehicle (V2V).

Consequently, advancement in future networks is driven by the demand to provide and account for massive connectivity and volume, expanded throughput and capacity, and ultra-low latency.

Fifth generation (5G) mobile access networks, which can also be referred to as New Radio (NR) access networks, are currently being developed and expected to handle a very wide range of use cases and requirements, including among others enhanced mobile broadband (eMBB) and machine type communications (e.g., involving IOT devices). 5G wireless communication networks are expected to fulfill the demand of exponentially increasing data traffic and to allow people and machines to enjoy gigabit data rates with very low latency. Compared to existing fourth generation (4G) technologies, such as long-term evolution (LTE) networks and advanced LTE networks, 5G provides better speeds and coverage, targeting much higher throughput with low latency and utilizing higher carrier frequencies (e.g., higher than 6 gigahertz (GHz)) and wider bandwidths. A 5G network also increases network expandability up to hundreds of thousands of connections.

The above-described background relating to cellular networks and fixed packet networks is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide an understanding of the subject disclosure. It may be evident, however, that the subject disclosure may be practiced without these specific details. In other instances, well-known structures and devices are shown in block diagram form to facilitate describing the subject disclosure. For example, the methods (e.g., processes and logic flows) described in this specification can be performed by devices (e.g., computers, resource upgrade predictor, user equipment (UE), network node device, etc.) comprising programmable processors that execute machine executable instructions to facilitate performance of the operations described herein. Examples of such devices can be devices comprising circuitry and components as described in FIG. 9 and FIG. 10.

The present patent application relates to a resource upgrade predictor that is operable to receive, from a first network node device, traffic information. Based on the traffic information, the resource upgrade predictor can obtain network utilization data related to other network node devices having a similar interference characteristic (e.g., signal-to-noise ration) to the first network node device. The resource upgrade predictor can use this network utilization data to determine a demand, or level of demand, at which at least a defined value related to a transmission link capacity associated with transmissions between the first network node and the user equipment, is attained (e.g., a percentage of physical resource block loading). The resource upgrade predictor can obtain projected demand data associated with the geographic area serviced by the first network node, and determine, based upon the demand and the projected demand data, a time at which a network resource upgrade related to the first network node device, is to be performed.

Figure 1:
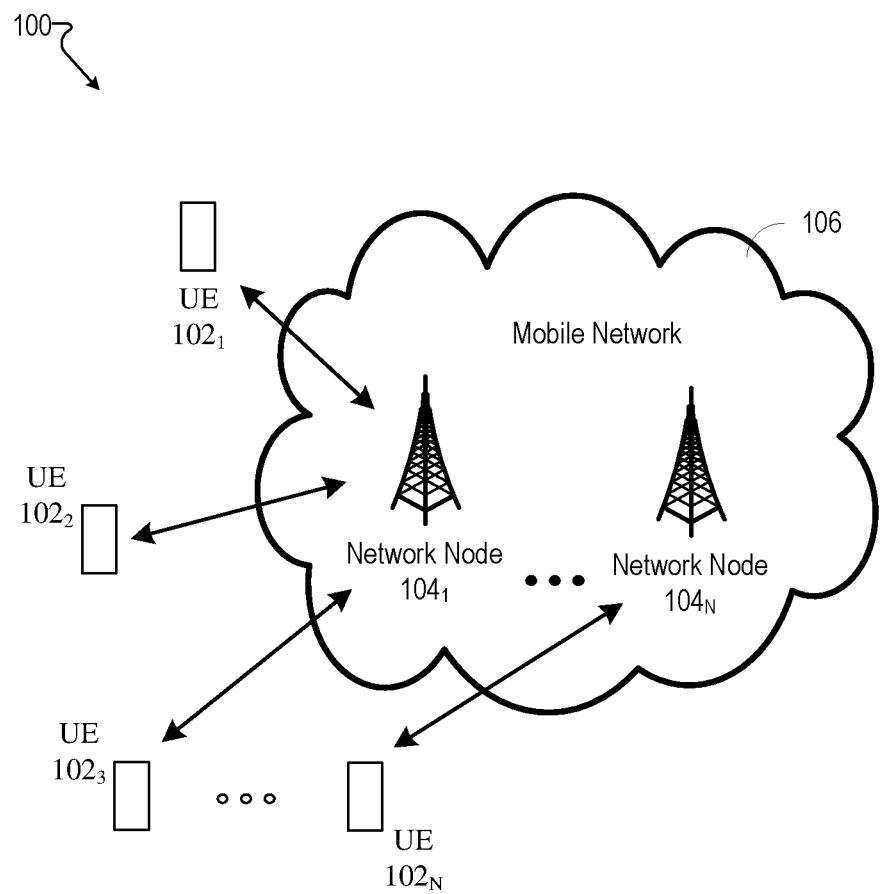
FIG. 1 illustrates an example wireless communication system in which a network node device (e.g., network node) communicates with user equipment (UEs), or user devices, in accordance with various aspects and embodiments of the subject disclosure.

FIG. 1 illustrates an example mobile communication system 100 (also referred to as mobile system 100) in accordance with various aspects and embodiments of the subject disclosure. In example embodiments (also referred to as non-limiting embodiments), mobile system 100 can comprise a mobile network 106, which can comprise one or more mobile networks typically operated by communication service provider entities. The mobile system 100 can also comprise one or more user equipment (UE) 102 (also referred to as UE 102 in the singular, and UE $102_{1-N}$ or UEs 102 in the plural); also referred to as user devices. The UEs 102 can communicate with one another via one or more network nodes 104 (also referred to network node 104 in the singular, and network nodes $104_{1-N}$ or network nodes 104 in the plural), also referred to as network node devices.

UEs 102 can comprise, for example, any type of device that can communicate with mobile network 106, as well as other networks (see below). A UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. UE 102 can also comprise IOT devices that communicate wirelessly.

Mobile network 106 can include various types of networks, including but not limited to, cellular networks, femtocell networks, picocell networks, microcell networks, internet protocol (IP) networks, Wi-Fi networks associated with the mobile network (e.g., a Wi-Fi "hotspot" implemented by a mobile handset), and the like. For example, in at least one implementation, mobile system 100 can be or can include a large scale wireless communication network that spans various geographic areas, and comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., between the UE 102 and the network node 104). While example embodiments might be described for 5G new radio (NR) systems, the embodiments can be applicable to any radio access technology (RAT) or multi-RAT system where the UE operates using multiple carriers. For example, mobile system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, and the like.

Still referring to FIG. 1, in example embodiments, UE 102 can be communicatively coupled (or in other words, connected) to one or more network nodes 104 of the mobile network 106. A network node 104 can have a cabinet and other protected enclosure, an antenna mast, and multiple antennas for performing various transmission operations (e.g., MIMO operations). Each network node 104 can serve several cells, also called sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an eNode B device (e.g., evolved NodeB), a network controller, a radio network controller (RNC), a base station controller (BSC), a relay, a donor node controlling relay, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the network node is referred to by some as a gNodeB device.

Still referring to FIG. 1, in various embodiments, mobile network 106 can be configured to provide and employ 5G cellular networking features and functionalities. 5G wireless communication networks are expected to fulfill the demand of exponentially increasing data traffic and to allow people and machines to enjoy gigabit data rates with very low latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastically different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Still referring to FIG. 1, to meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second for tens of thousands of users, 1 Gbps to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz, is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

To meet the large demand due to the growth of the number of devices and due to growth of usage of the spectrum by user applications on such devices, communications service provider entities strive to upgrade their infrastructure by adding more resource to service the demand and support the end user experience when the user experience is projected in the future to degrade below some parametric threshold. This might entail, for example, adding an additional network node, additional radio elements to a network node, a base station, a remote radio unit, etc. However, the pre-mature addition of more equipment, when it is not warranted can be costly. The question about capacity growth for any radio (e.g., radio additions to network node) is "when should we grow this particular radio and add another radio?"

Figure 2:
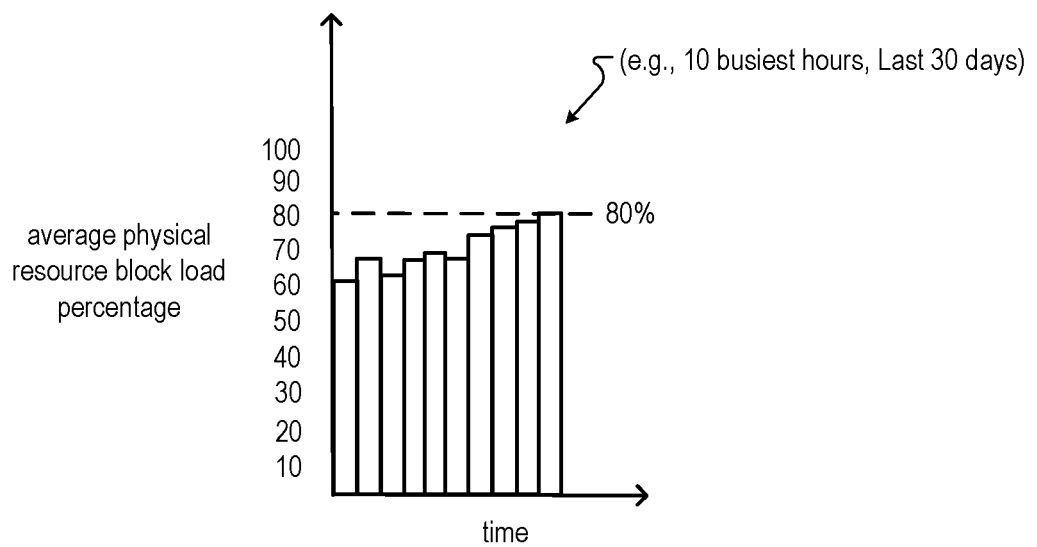
FIG. 2 illustrates an example graph depicting an example resource upgrade threshold related to the average physical resource block (PRB) loading percentage.

FIG. 2 illustrates a graph depicting an example of the use of one measure to determine when to add resources to an existing cellular network to accommodate increased demand In the example of FIG. 2, bandwidth utilization, such as the percentage of radio physical resource block (PRB) loading, is used to predict exhaustion of radio links between a network node (e.g., network node 104) and a UE (e.g., UE 102). As shown in the graph of FIG. 2, AT&T, for example, uses data relating to the ten busiest hours of the last thirty days. Examining this data, when the average physical resource block loading over those hours exceeds 80% of maximum possible load, the hosting node (e.g., base station sector) is flagged for radio growth (e.g., resource upgrades). Again, these radio additions to existing nodes can be very expensive.

The applicants' research has shown that PRB loading is only loosely associated with channel capacity which is required to support communications and end-user experience. For example, a PRB can support the transmission of different amounts of data depending on the modulation codec used in the radio communication. The modulation codec chosen is dependent on the signal to noise ratio (SNR) of the channel between a node and a UE. Signal to noise ratio is primarily driven by distance of a UE from a base station. In summary, UEs that are far from network nodes tend to have low SNR, leading to lower throughput codecs and less efficient PRB utilization. The use of a threshold that is 80% PRB loading (e.g., as shown in FIG. 2) may be a good indicator, but it may also be substantially in error based on the conditions for individual node radios. A blanket PRB threshold can lead to triggers for radio growth too soon in some cases, and too late in other cases. When triggered too soon, telecommunications service providers would be spending money on infrastructure before the need arises. When the call for radio growth is triggered too late, the customer experience can suffer.

As an example of how throughput can differ in different scenarios, three cases can be considered. In the first case, a base station is beside the freeway in a rural area. When UEs get close to the base station, there is very little interference from other base stations. In the second case, a base station is next to a road in a dense, urban area. When UEs get close to the base station, there is a lot of interference from other base stations. In the third case, a base station resides on a mountaintop, where UEs do not get close and there is little interference from other base stations. For a given level of PRB loading, these three conditions would yield quite different data throughput volumes and corresponding user experiences. The present application provides for a method for triggering (or informing of a schedule for) radio growth that incorporates information from both the radio control plane and Layer 3 IP-based information that is closer to the user experience (e.g., based upon the demand of the user, and the conditions of the radio link).

Figure 3:
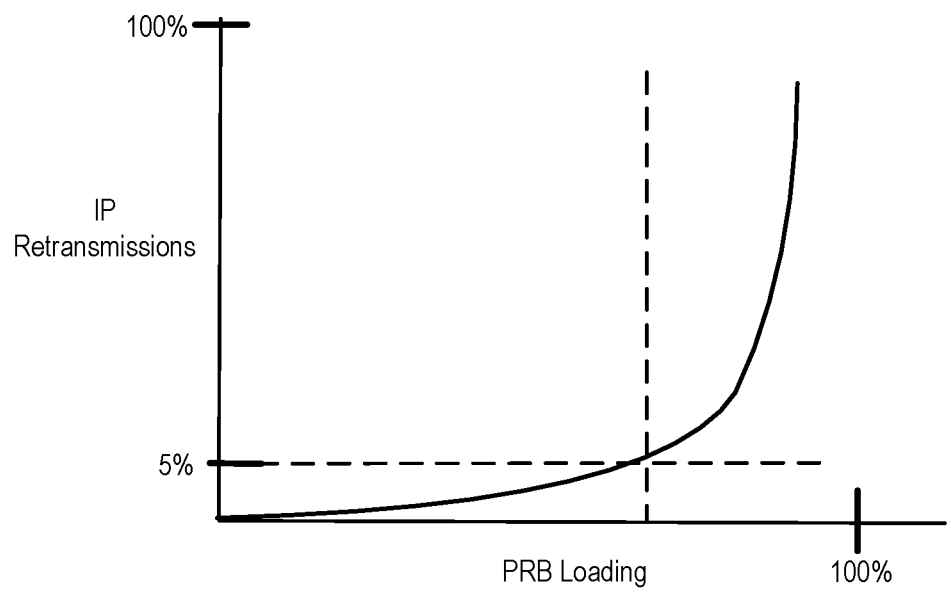
FIG. 3 illustrates an example graph of a relationship between PRB loading and retransmissions of data packets.

An example resource upgrade predictor in accordance with the present application considers, among other factors, re-transmissions of data, and the impact those re-transmissions can have on PRB loading. As mentioned above, the capacity of a radio can be reasonably tested by the user experience (e.g., number, or quantity, of packets transmitted by a UE, which can reflect demand by the UE). A factor of data packet communications quality is packet retransmission. Once data packet collisions occur, the retransmission of these packets increase the total number of packets to be transmitted in a non-linear manner, which in turn, impacts the bandwidth utilization (e.g., PRB loading), also nonlinearly. An example graph illustrating this relationship is shown in FIG. 3.

Figure 4:
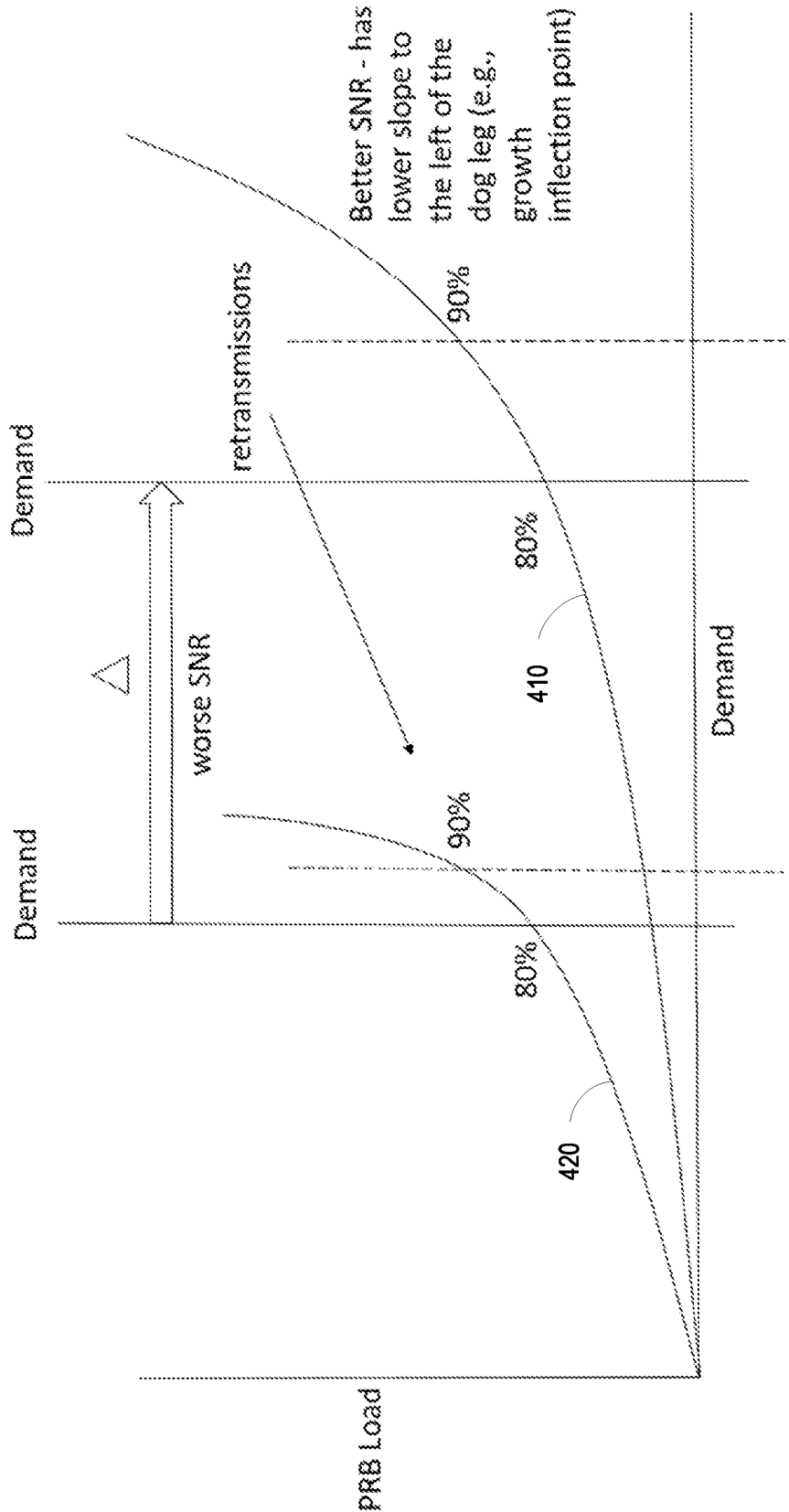
FIG. 4 illustrates a graph comprising two curves, each with difference interference characteristics.

There is another dependency on the type of data being transmitted. Streaming data content may suffer from audio or video glitches, but non-streaming data requires successful packet transfers. Therefore, even measures on Layer 3, such as latency or packet retransmission, are inconclusive about user experience. The present application's machine learning methods and systems not only accounts for re-transmissions, but also applies machine learning to account for the highly non-linear function between PRB loading and user experience (e.g., demand by UEs). In other words, the system and methods account for a relationship between the packet data demand and PRB utilization. As an example, a graph shown in FIG. 4 illustrates two curves, wherein each curve relates to a different node (e.g., network node $104_1$, network node $104_2$) operating in two sites under difference conditions (e.g., distance, interference, etc.), resulting in different SNR profiles associated with communications between the network node and its respective user devices. Each curve represents the growth rate of PRB utilization (or, put another way, impact on PRB utilization) for the network node, based upon both user experience (e.g., demand) under the aforementioned conditions. For both curves, PRB loading grows at a certain rate for certain amounts of data communicated.

In one example network node site, represented by a first curve 410 in FIG. 4, for example, the UEs are closer to the network node, and there is more throughput due to a relatively better SNR. For this curve, even given the same demand (e.g., similar number of users, similar demand for data usage), the point (growth inflection point) at which the curve reaches a PRB loading threshold of, for example, 80%, and tails upward, is further to the right of a second curve 420 in which the growth inflection point occurs much earlier, and tails upward at a faster rate, even with a similar number of users, and a similar amount of user demand. This site can deliver data with less PRB loading, and has a relatively lower slope value (e.g., not as steep as second curve 420).

In the example shown in FIG. 4, the second curve 420 represents a network node site where the SNR is worse (e.g., due to further distance from the node, more interference from other network nodes, etc.) than the network node site related to first curve 410. Additionally, tor the site related to second curve 420 in which the SNR is worse, the codec used by the network node to code and decode transmissions to and from the network node, degrades faster. Before PRBs have been used, packet loss due to SNR begins to occur (e.g., interference causes collisions of packets of data, resulting in loss), and this in turn causes and results in re-transmissions of data. As such, retransmissions occur because of a depletion of SNR, not because there is a lack of PRBs. Regarding this second curve 420, reflective of a higher SNR on the radio link, the slope of the curve left of the point at which the curve ascends more rapidly (e.g., dogleg, growth inflection point) has a steeper slope in large part due to the network node's use of a lower codec rate. When the SNR is worse, the node will drop to the lower codec rate—instead of a 128 Quadrature Amplitude Modulation (QAM) scheme, for example, it drops to using quadrature phase shift keying (QPSK). For a given amount of demand, it takes more PRB due to the communications operating on a lower codec rate. For fewer transmissions than for first curve 410, more PRBs would likely be required. The growth inflection point occurs due to the larger number of retransmissions. If the network's bandwidth keeps becoming loaded up, the PRBs might be depleted faster. If there are no more PRBs available, but the SNR is still good, there would not be a growth inflection point where there is a rapid rise in the steepness of the slope. Thus, the more non-linear part of the curves would be accelerated due to re-transmissions.

Given the transmission conditions, the shape of the curve is further influenced by the user experience (e.g., demand for data), which further loads PRBs and shifts the curve rightward. However, an increase in demand in a network with better SNR would see a growth curve that is not as steep as that of a growth in demand in a network with poor SNR, as shown in FIG. 4.

The example resource upgrade predictor of the present application accounts for these curves, which consider both SNR (as indicated by re-transmissions, switches to lower codecs, etc.) and demand in PRB loading, in determining when to add new infrastructure resource. The resource upgrade predictor uses empirical data to find similar parts of the network—network nodes that have the same re-transmission characteristics (e.g., SNR), and demand reaction, to determine the relevant curve associated with an examined network node. The machine-machine learning aspects of the present systems and methods relate to the review of a multitude of network nodes, their demand and re-transmission behavioral patterns, and using these historical utilizations to determine when to upgrade infrastructure. Referring again to FIG. 4, communications between a network node and a UE having the characteristics as first curve 410 are characterized with different slope characteristics from one of, for example, second curve 420. For a particular network node, the resource upgrade predictor of the present application is operable to determine, based on present and historical data, the type of radio link (e.g., high or low SNR, for example) that the network node relates to. As an example, based on the PRB loading, and the demand at the network node, it can be determined that a steeper slope is involved (e.g., second curve 420). As such, once, for example, 75% of average PRB loading has been reached, it can be determined that the PRB loading for the node will increase nonlinearly at the inflection growth point of second curve 420 if demand increases. On the other hand, if the behavior of the network node is such that the linear portion of the demand-PRB loading has a relatively flatter slope (e.g., first curve 410), then even at 75% PRB loading, it can be determined that more demand will be needed to drive the PRB loading to 90%, than the amount of demand needed to drive PRB loading to 90% if the radio link exhibited the characteristics of the second curve 420. Thus, by looking at similar nodes (with respect to SNR/retransmissions, and demand), the resource upgrade predictor can predict at what demand 80% of PRB loading might occur, as well as how much more demand can increase before it reaches 90% of PRB loading.

In addition to predicting at what demand a certain percentage of PRB loading occurs, the resource upgrade predictor can also use that demand to determine a time at which to upgrade the resource, based on the predicted demand reaching a certain PRB loading percentage. As an example, if it is determined that a demand can grow to a certain level, say X number of transmitted packets, on a particular radio link before an upgrade is needed, the resource upgrade predictor can then determine how long (e.g., how much time) it would take for that user experience (demand) to reach X. Data growth can be predicted, for example, by quantity of subscribers, and also by the usage of data by each of those subscribers. Marketing research, for example can determine the number of users in a certain geographic area, and account for growth of data usage in that area. As another example factor, the number of applications on a UE (e.g., mobile phone), the type of applications downloaded on the UE, and the usage of each application on the UE can all be indicators that can be used to predict when demand will reach a certain point.

Thus, PRB loading can be projected into the future, and by predicting growth in mobile devices and analyzing the amount of data predicted to be used in the future per device, the resource upgrade predictor can determine a time at which the demand reaches a point, or level, at which the PRB loading exceeds, or attains, a certain threshold.

Figure 5:
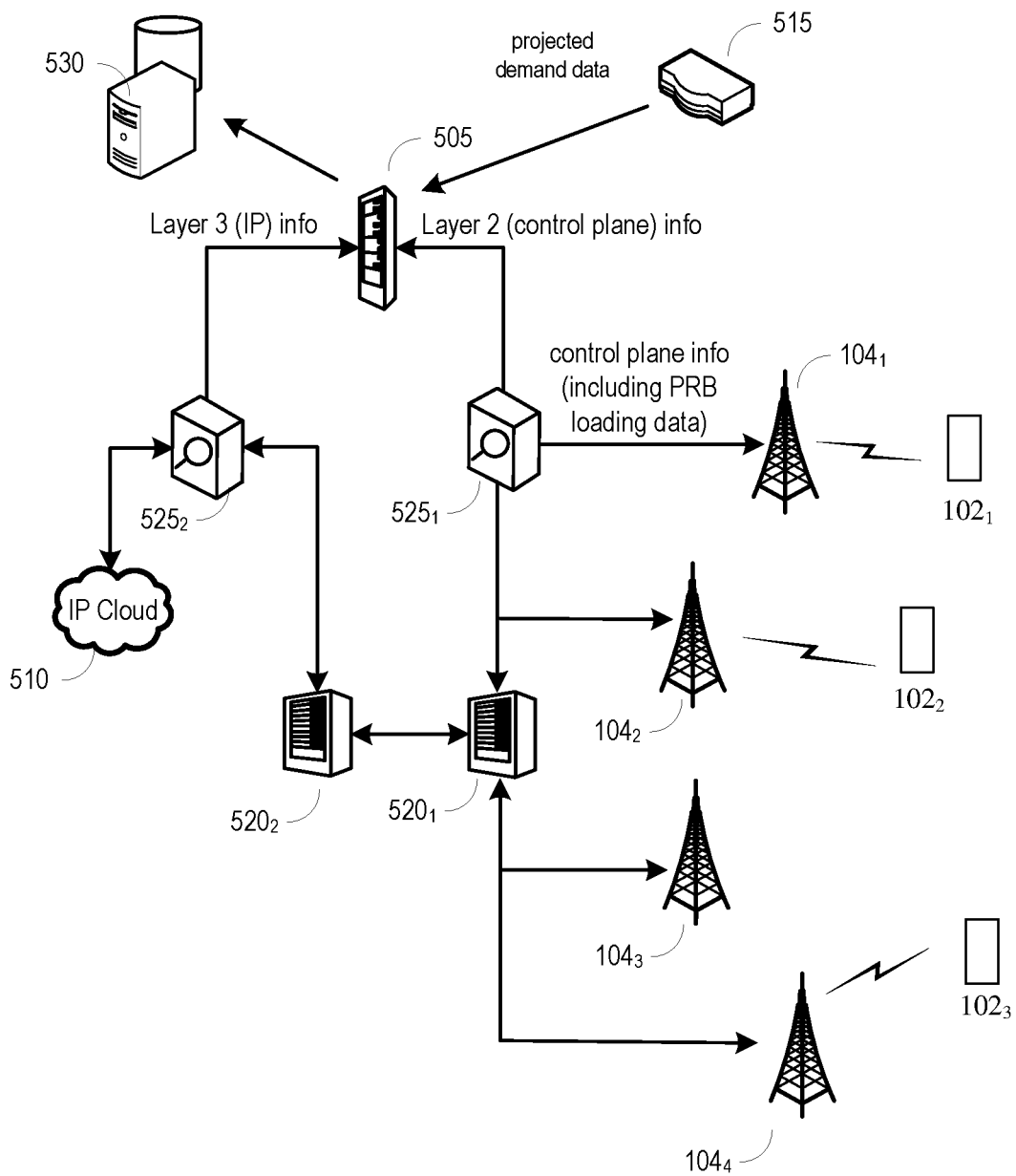
FIG. 5 illustrates an example system comprising a resource upgrade predictor, in accordance with various aspects and embodiments of the subject disclosure.

Moving now to FIG. 5, an example resource upgrade predictor 505 can comprise one or more computing devices (e.g., it can thus be a device, or a system), operable to perform example methods and operations in accordance with example embodiments of the present application, as described herein in. Additionally, machine-readable storage medium, comprising executable instructions that, when executed by one or more processors of the resource upgrade predictor 505, can also facilitate performance of methods and operations. The resource upgrade predictor 505 can be located anywhere in a networked environment and can be integrated with other devices within mobile network (e.g., mobile network 106). As shown in FIG. 5, packets can be transmitted by UEs (e.g., UEs $102_{1-3}$) through the network via network node devices (e.g., network nodes $104_{1-4}$). The packets can travel through the network, including through another service provider's network (e.g., represented by IP cloud 510). Packets from another service provider's network can also be destined for the UEs.

In example embodiments in accordance with the present application, the resource upgrade predictor 505 can receive from a first network node device (e.g., as shown in FIG. 5, network node $104_1$), traffic information comprising a first number of transmitted data packets between a user equipment (e.g., as shown in FIG. 5, UE $102_1$) and the first network node device, wherein the first number of transmitted packets is reflective of a demand associated with the user equipment serviced by the first network node (e.g., UE $102_1$). Generally, the traffic information relating to transmissions between the UEs and network nodes can be received via, for example, the control plane, which carries signaling information (e.g., Layer 2 information). The number of transmitted packets can inform as to the demand from UEs serviced by the network nodes.

The traffic information can also comprise a second number of re-transmitted data packets comprising a re-transmission of at least one of the transmitted data packets between the user equipment and the first network node device. This information regarding the number of re-transmissions can be received via, for example, a Layer 3 (IP) protocol, and can include information from network nodes. Layer 3 informs about absolute throughput and retransmissions. The number of retransmissions can be used by the resource upgrade predictor 505 to determine the SNR characteristics associated with the first network node device.

Based on the traffic information, the resource upgrade predictor can obtain network utilization data related to a second network node (e.g., the network utilization data related to network nodes $104_2$, $104_3$, or $104_4$ as shown in FIG. 5) having similar interference characteristics to the first network node device.

Using the network utilization data (e.g., information that is used to construct first curve 410, or second curve 420), the resource upgrade predictor 505 can determine a demand at which at least a defined value related to a transmission link capacity associated with transmissions between the first network node and the user equipment, is attained.

Thus, based on the PRB growth curve (e.g., first curve 410, second curve 420) associated with the similar network nodes, the resource upgrade predictor can determine, for the first network node device, a demand at which the level of user experience (e.g., how much traffic from UEs) would result in a PRB loading percentage threshold of, for example 80%.

The resource upgrade predictor 505 can then obtain projected demand data from, for example, a computing device operated by a marketing department personnel (e.g., marketing computing device 515) associated with the geographic area serviced by the first network node. Marketing personnel typically conduct studies and generate data related to projected demand associated with a particular geographic and the devices within that area.

The resource upgrade predictor 505 can determine, based upon the demand and the projected demand data, a time at which a network resource upgrade related to the first network node, is to be performed. Put another way, once the amount of demand that would lead to a threshold percentage of utilization has been determined, the resource upgrade predictor can then determine, based on marketing data (e.g., based on the projected growth of devices serviced by the network node at issue, the number and type of applications downloaded and used by users in the location, etc.) a time at which the demand will rise to a level that reaches the PRB loading percentage threshold. For example, the resource upgrade predictor 505 can determine that in nine months, traffic at this network node will reach a demand point that will result in 80% loading of the PRBs associated with transmissions between the network node and the user devices.

Thus, because the resource upgrade predictor 505 has machine-learned the PRB loading behaviors of similar network nodes (e.g., with similar SNR characteristics) based on demand and re-transmissions, the resource upgrade predictor 505 can predict for any node having similar SNR characteristics and demand levels, at what demand level and time that network node will reach a certain loading capacity, such as 80% PRB loading. Additionally, this process can also inform as to how much more quickly PRB loading can reach, for example, 90% PRB loading (e.g., sooner if the network node has SNR characteristics reflective of network nodes associated with, for example, first curve 410). If a particular network node adheres to, for example second curve 420, it will reach 90% PRB loading faster than a network node that is more similar to first curve 410.

Radio control subnets (e.g., radio control subnet $520_1$ and radio control subnet $520_2$), packet gateways (e.g., packet gateway $525_1$ and packet gateway $525_2$) and other network elements, can also serve as intermediary devices within the network that route or aggregate traffic, and Layer 3 and Layer 2 information, to be passed onto the resource upgrade predictor 505.

In this manner, PRB loading projections are used, but the resource upgrade predictor also makes projections based on the association of PRB loading with IP performance measures on Layer 3 with the PRB load independently for every radio (e.g., at a network node) in the network. Each radio encounters non-linear packet retransmission growth at different levels of PRB loading. The level for each radio is treated as a threshold that is specific to that radio. By projecting future PRB loading, it can be better predicted when user experience will degrade non-linearly. This projection can inform as to when radio capacity upgrades would be more optimal. The resource upgrade predictor can be further operable to transmit an alert, or electronic message, to one or more computer terminals, for example (user terminal 530), so that service network personnel can be alerted of a desire to upgrade. The alert can be a visual or audible indicator that can, for example, direct the attention of personnel to a report (which can show, for example, a graph, or a table) indicating the point in time at which various PRB loading percentages would be expected to occur.

Figure 6:
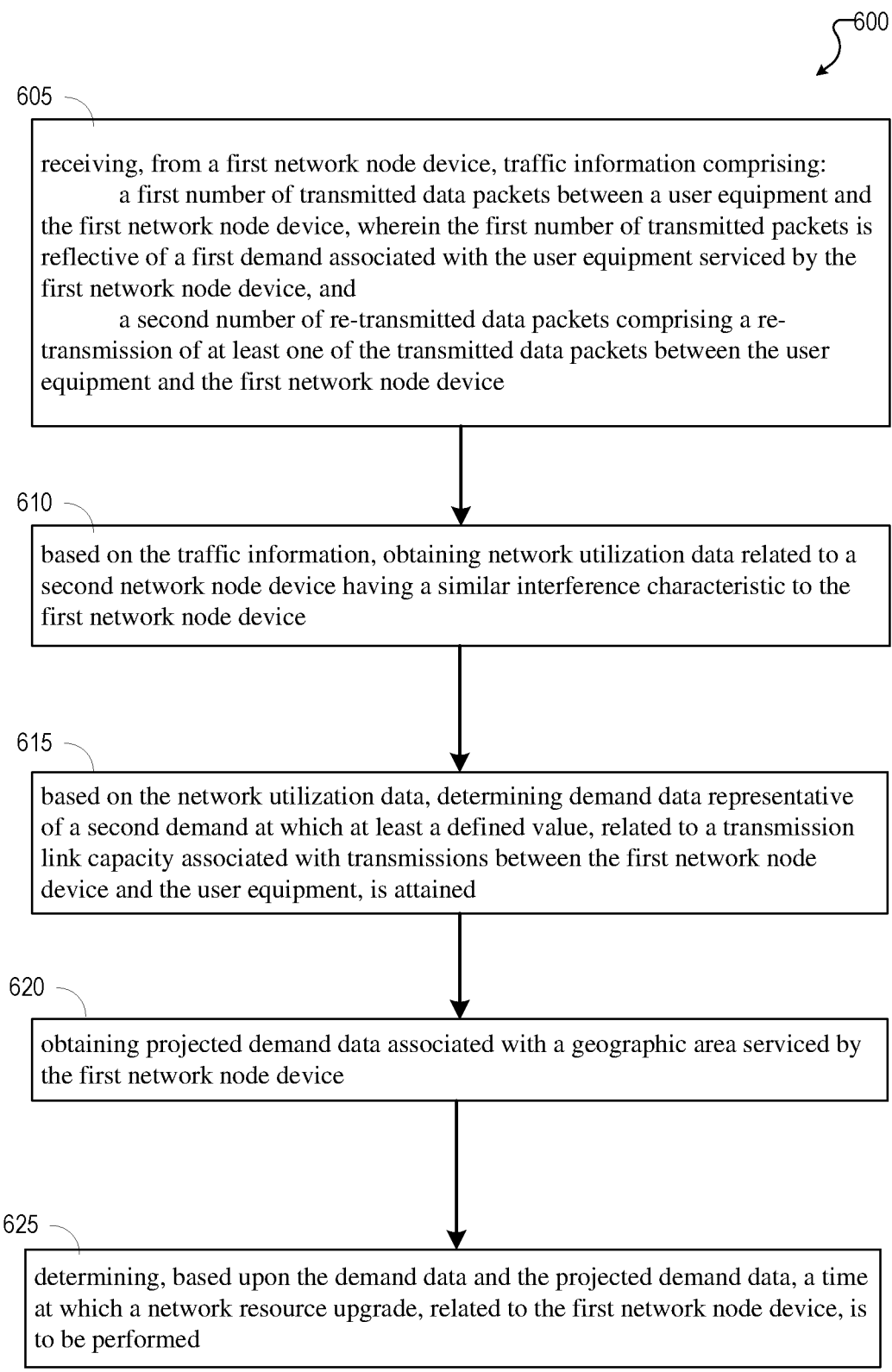
FIG. 6 illustrates an example operation that can be performed by a resource upgrade predictor, in accordance with various aspects and embodiments of the subject disclosure.
Figure 7:
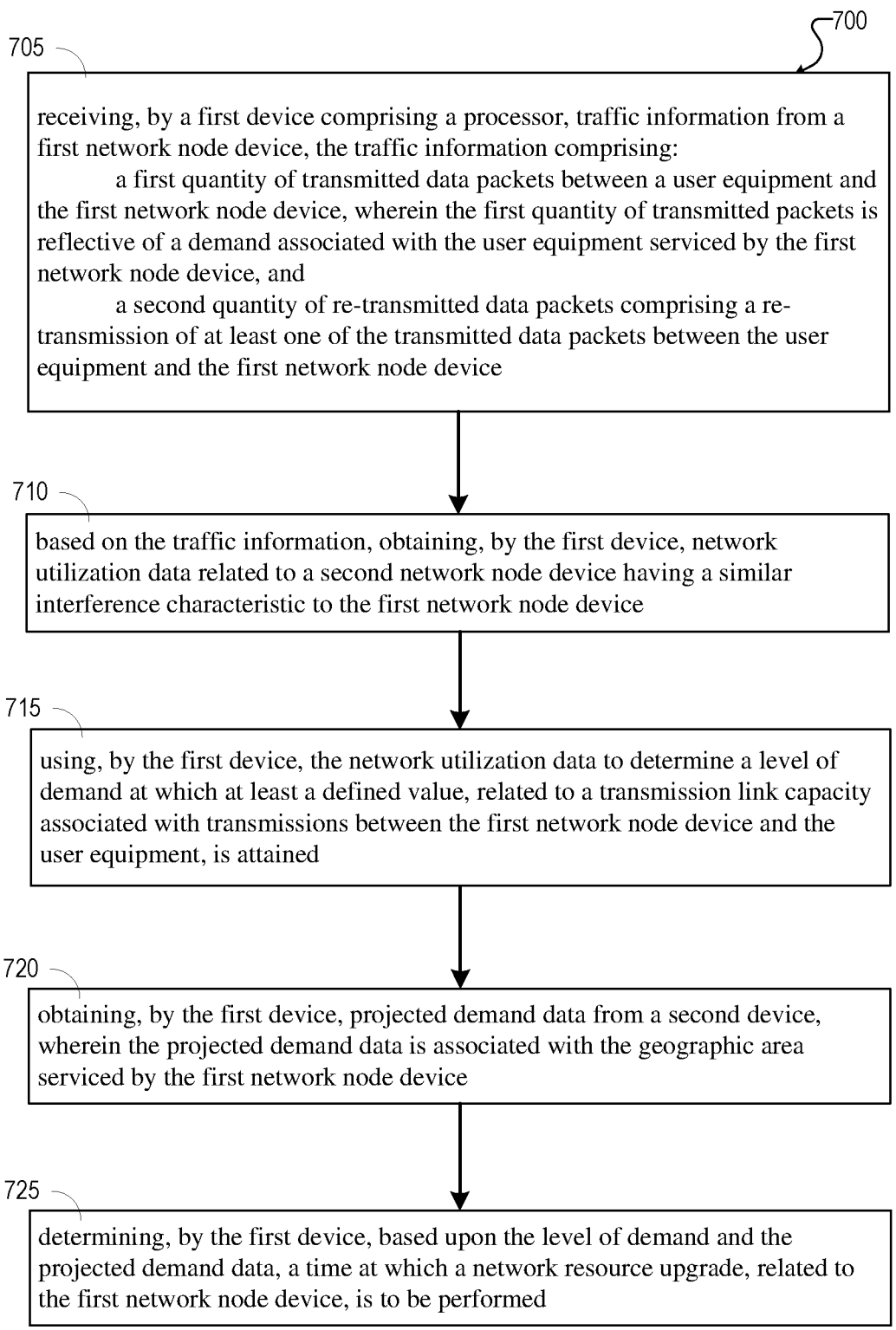
FIG. 7 illustrates another example operation that can be performed by a resource upgrade predictor, in accordance with various aspects and embodiments of the subject disclosure.
Figure 8:
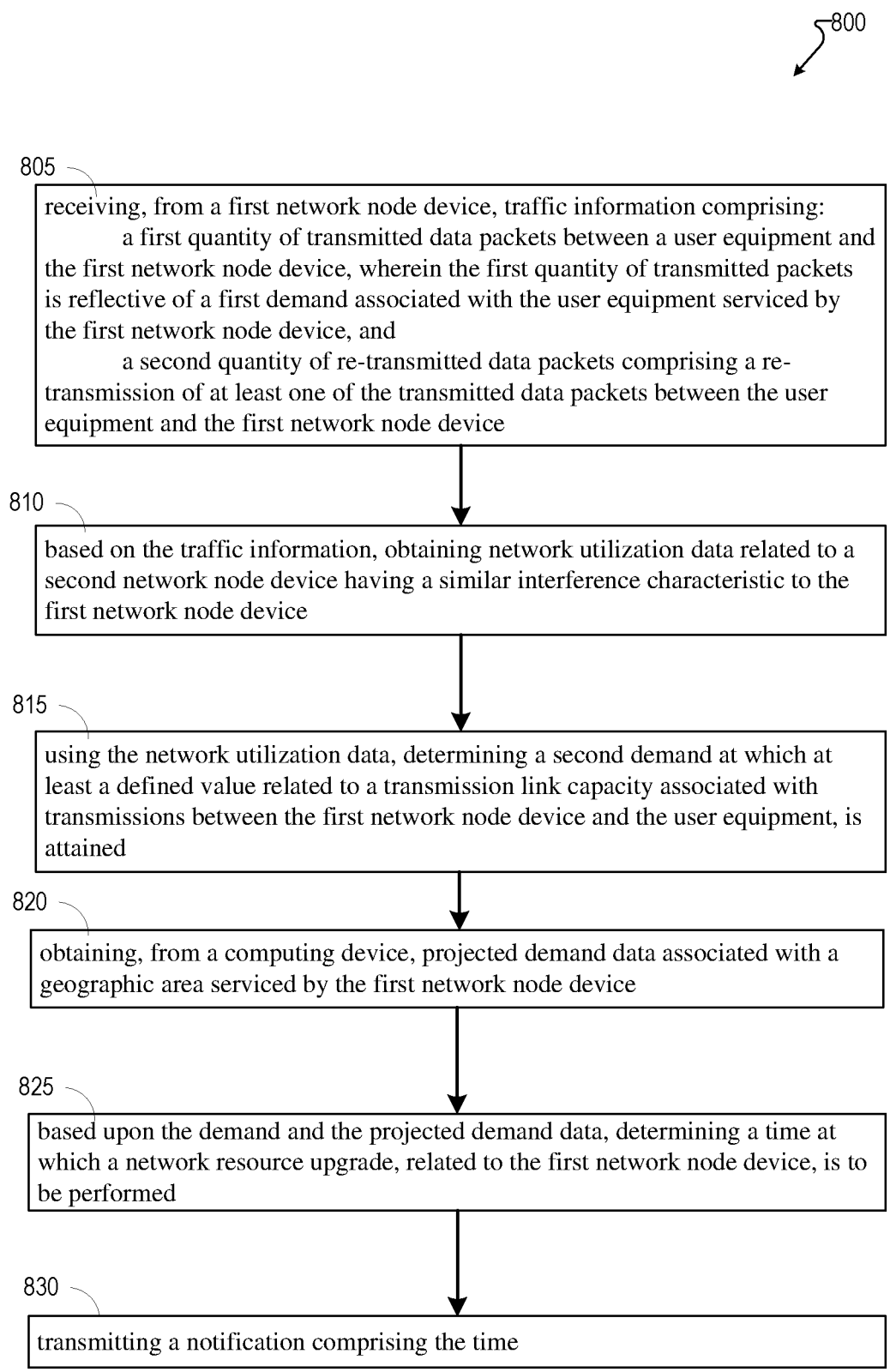
FIG. 8 illustrates another example operation that can be performed by a resource upgrade predictor, in accordance with various aspects and embodiments of the subject disclosure.

In accordance with example embodiments, a device comprising a processor and memory, can be operable to perform example methods and operations, as illustrated in flow diagrams as described in FIGS. 6-8 in accordance with various aspects and embodiments of the subject disclosure. Additionally, machine-readable storage medium, comprising executable instructions that, when executed by a processor, can also facilitate performance of the methods and operations described in FIGS. 6-8.

In non-limiting embodiments (also referred to as example embodiments), as shown in FIG. 6, a resource upgrade predictor, which can be a system or a device, (e.g., resource upgrade predictor 505), can comprise a processor and a memory that stores executable instructions that, when executed by the processor, facilitate performance of operations 600.

The operations 600 can comprise, at step 605, receiving, from a first network node device (e.g., network node 104), traffic information comprising a first number of transmitted data packets between a user equipment (e.g., UE 102) and the first network node device, wherein the first number of transmitted packets is reflective of a first demand associated with the user equipment serviced by the first network node device. The information regarding the transmitted data packets can be received via, for example, a protocol comprising a layer two internet protocol.

The traffic information can also comprise a second number of re-transmitted data packets comprising a re-transmission of at least one of the transmitted data packets between the user equipment and the first network node device. The information regarding the re-transmitted data packets can be received via, for example, a protocol comprising a layer three internet protocol.

The transmitted data packets and the re-transmitted data packets are transmitted via a wireless radio link between the first network node device and the user equipment. The re-transmitted data packets can be re-transmitted due to, for example, interference via the wireless radio link. Interference can cause packets transmitted via the wireless radio link to be lost, which leads to the re-transmission of those packets.

The operations at step 610 can comprise, based on the traffic information, obtaining network utilization data (e.g., PRB loading data as used to generate, for example, first curve 410 or second curve 420) related to a second network node device having a similar interference characteristic (e.g., SNR) to the first network node device.

The operations can comprise, at step 615, based on the network utilization data, determining demand data representative of a second demand at which at least a defined value, related to a transmission link capacity associated with transmissions between the first network node device and the user equipment, is attained. The transmission link capacity can be reflective of a quantity of physical resource blocks comprising time intervals in which the transmitted data packets and the re-transmitted data packets are to be transmitted via the wireless radio link.

At step 620, the operations can further comprise obtaining projected demand data associated with a geographic area serviced by the first network node device. The projected demand data can be based on the number of software applications used by mobile devices associated with the geographic area. The projected demand data can be based on a type of the software applications used by the mobile devices associated with the geographic area.

At step 625, the operations can comprise determining, based upon the demand data and the projected demand data, a time at which a network resource upgrade, related to the first network node device, is to be performed.

In non-limiting embodiments (also referred to as example embodiments), as shown in FIG. 7, a resource upgrade predictor, which can be a system or a device, (e.g., resource upgrade predictor 505), can comprise a processor and a memory that stores executable instructions that, when executed by the processor, facilitate performance of a method 700.

The example method 700 can comprise, at step 705, receiving traffic information from a first network node device (e.g., network node 104), the traffic information comprising a first quantity of transmitted data packets between a user equipment (e.g., UE 102) and the network node device, wherein the first quantity of transmitted packets is reflective of a demand associated with the user equipment serviced by the first network node device.

The traffic information can also comprise a second quantity of re-transmitted data packets comprising a re-transmission of at least one of the transmitted data packets between the user equipment and the first network node device. The transmitted data packets and the retransmitted data packets are transmitted via a wireless radio link between the first network node device and the user equipment. The re-transmitted data packets are re-transmitted due to, for example, interference via the wireless radio link.

The example method of 700, can at step 710, further comprise, based on the traffic information, obtaining network utilization data (e.g., PRB loading data as used to generate, for example, first curve 410 or second curve 420) related to a second network node device having a similar interference characteristic (e.g., SNR) to that of the first network node device.

The example method 700 at 715 can further comprise, using the network utilization data to determine a level of demand at which at least a defined value, related to a transmission link capacity associated with transmissions between the first network node device and the user equipment, is attained. The transmission link capacity can be reflective of a number of physical resource blocks comprising time intervals in which the transmitted data packets and re-transmitted data packets are transmitted via the wireless radio link.

The example method 700, at step 720, can comprise obtaining projected demand data from a second computing device, wherein the projected demand data is associated with a geographic area serviced by the first network node device.

The example method 700, at step 725, can comprise determining, based upon the level of demand and the projected demand data, a time at which a network resource upgrade, related to the first network node device, is to be performed. The network resource upgrade can comprise an augmentation of the first network node device to satisfy a projected demand associated with the projected demand data. The network resource upgrade can comprise an addition of a remote radio unit device to service a portion of the geographic area. The network resource upgrade can comprise the addition of a baseband unit device that communicates with the remote radio unit device.

In non-limiting embodiments (also referred to as example embodiments), as shown in FIG. 8, a resource upgrade predictor, which can be a system or a device, (e.g., resource upgrade predictor 505), can comprise a processor and a memory that stores executable instructions that, when executed by the processor, facilitate performance of operations 800. The instructions can be stored on a machine-readable storage medium.

The operations 800 can comprise, at step 805, receiving, from a first network node device (e.g., network node 104), traffic information comprising a first quantity of transmitted data packets between a user equipment (e.g., UE 102) and the first network node device, wherein the first quantity of transmitted packets is reflective of a first demand associated with the user equipment serviced by the first network node device. The traffic information can also comprise a second quantity of re-transmitted data packets comprising a re-transmission of at least one of the transmitted data packets between the user equipment and the first network node device.

The operations 800, at step 810, can further comprise, based on the traffic information, obtaining network utilization data (e.g., PRB loading data as used to generate, for example, first curve 410 or second curve 420) related to a second network node device having a similar interference characteristic (e.g., SNR) to that of the first network node device.

The operations 800, at step 815, can comprise, using the network utilization data, determining a second demand at which at least a defined value, related to a transmission link capacity associated with transmissions between the first network node device and the user equipment, is attained. The transmission link capacity is reflective of the first quantity of the transmitted data packets between a user equipment and the first network node device. The transmission link capacity also reflects the second quantity of the re-transmitted data packets between the user equipment and the first network node device.

The operations 800, at step 820, can comprise, obtaining, from a computing device, projected demand data associated with a geographic area serviced by the first network node device.

The operations 800, at step 825, can comprise, based upon the demand and the projected demand data, determining a time at which a network resource upgrade, related to the first network node device, is to be performed. The network resource upgrade can comprise adding a remote radio unit device to service a portion of the geographic area. The network resource upgrade can further comprise adding a baseband unit device that communicates with the remote radio unit device.

The operations 800, at step 830, can comprise, transmitting a notification comprising the time. This notification can be an alert displayed on, for example, a computer screen, or it can be an electronic message, etc.

Each of the methods and operations above (e.g., in FIGS. 6-8) can have steps, or elements or aspects of each step, which can be interchanged, or compatible, with each other method/operation.

Figure 9:
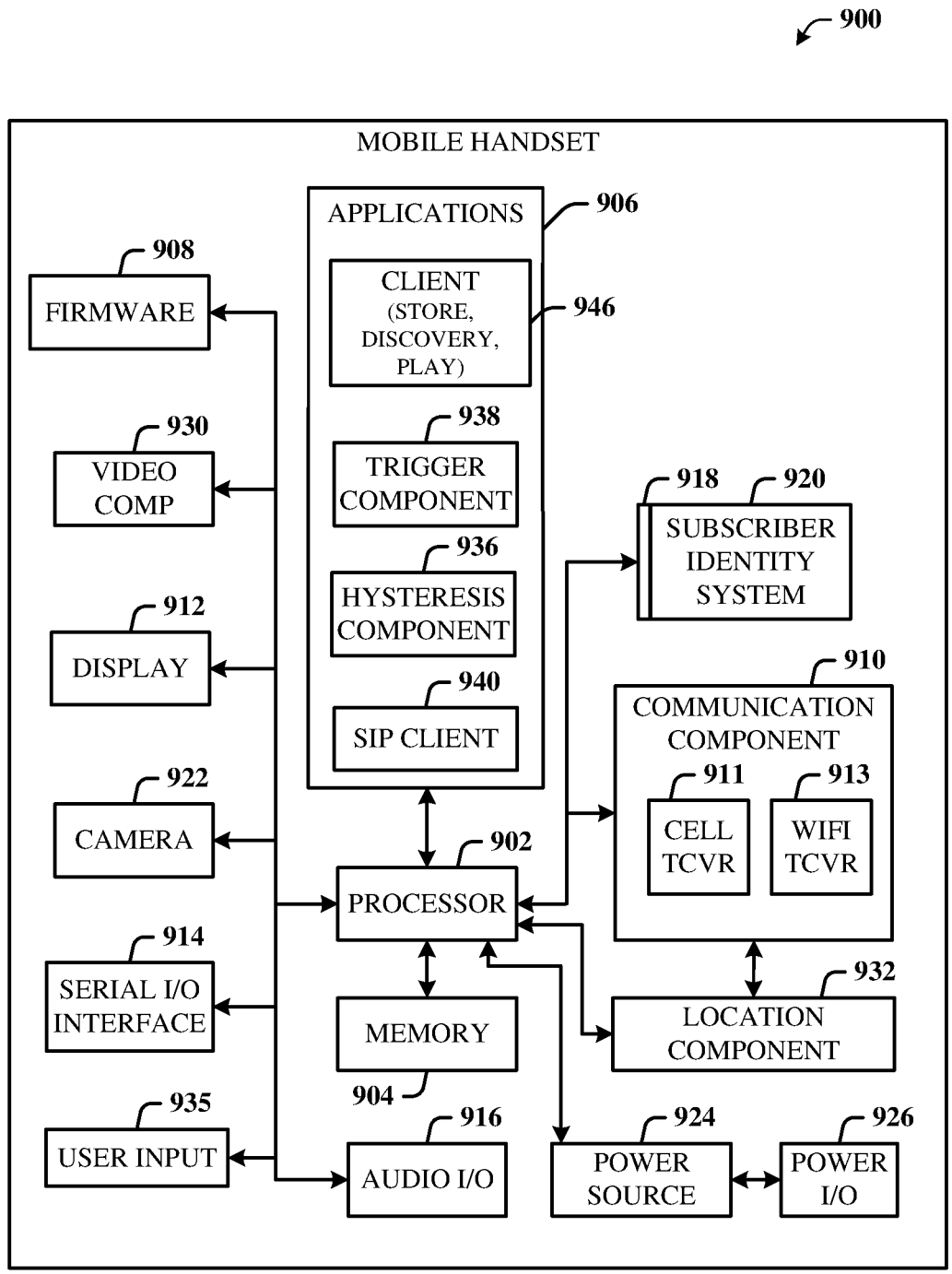
FIG. 9 illustrates a block diagram of an example mobile handset (which can be a UE), in accordance with various aspects and embodiments of the subject disclosure.

Referring now to FIG. 9, illustrated is a schematic block diagram of a user equipment (e.g., UE 102, etc.) that can be a mobile device (e.g., handset) 900 capable of connecting to a network in accordance with some embodiments described herein. Although a mobile handset 900 is illustrated herein, it will be understood that the mobile device can be other devices as well, and that the mobile handset 900 is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a global GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver 913). This function supports the indoor radio link, such as IEEE 802.11, for the handset 900. The handset 900 can accommodate at least satellite radio services through a handset that can combine wireless voice and digital radio chipsets into a single handheld device.

Figure 10:
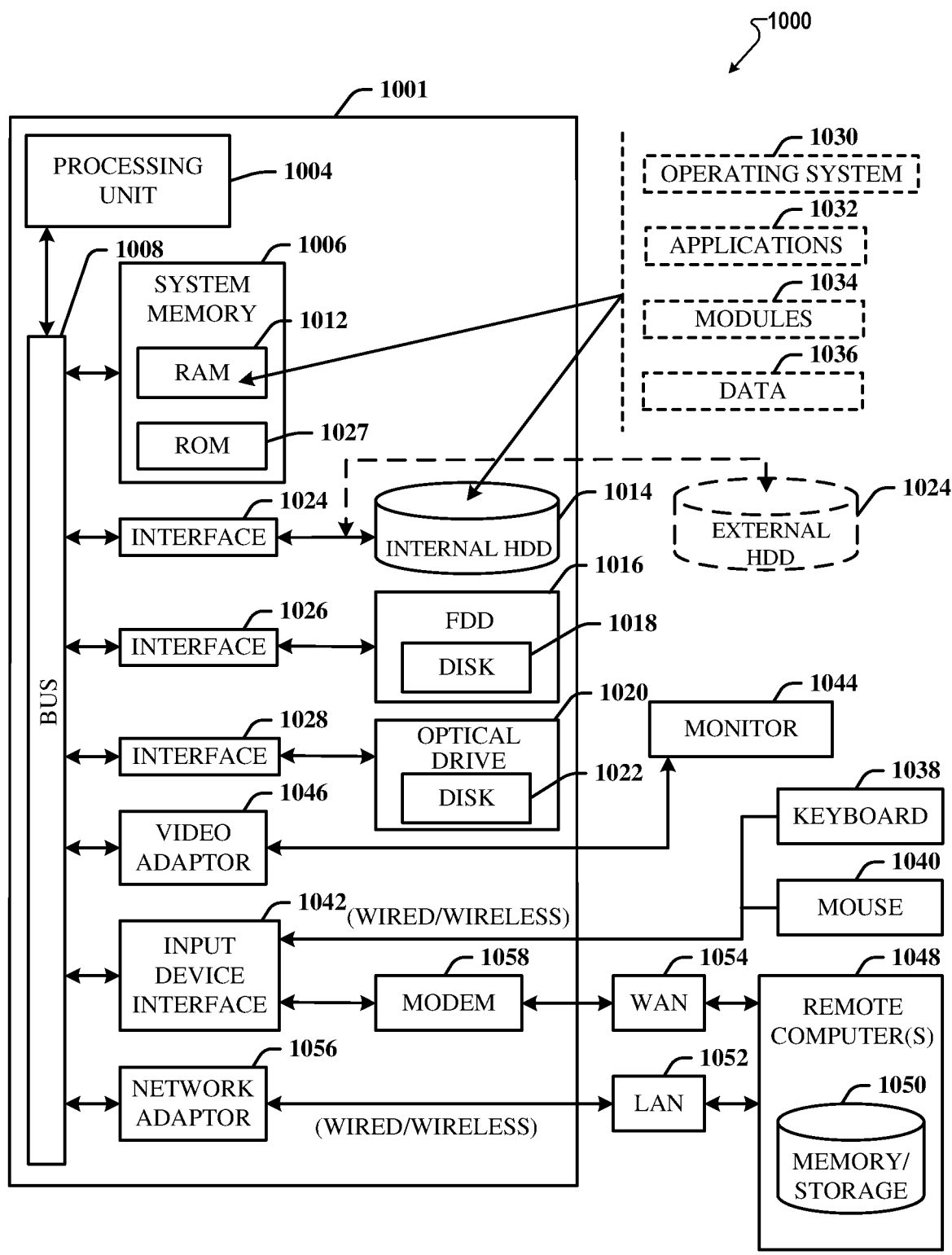
FIG. 10 illustrates a block diagram of an example computing device (e.g., computer), the components of which can comprise a resource upgrade predictor, that can be operable to execute processes and methods, in accordance with various aspects and embodiments of the subject disclosure.

Referring now to FIG. 10, there is illustrated a block diagram of a computer 1000 operable to execute the functions and operations performed in the described example embodiments. For example, a resource upgrade predictor device (e.g., resource upgrade predictor 505) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to devices (e.g., resource upgrade predictor, network nodes 104, etc.) can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 2394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 (LAN 1052) through a wired and/or wireless communication network interface or wireless adapter 1056. The wireless adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10 BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A device, comprising:
a processing system including a processor; and
a memory that stores executable instructions that, when executed by the processing system, facilitate performance of operations, comprising:
receiving, from first network equipment, traffic information reflective of first demand data associated with a user equipment serviced by the first network equipment,
based on the traffic information, determining that the first network equipment is operating in a period of non-linear signal degradation,
based on the non-linear signal degradation of the period in which the first network equipment has been determined to be operating, obtaining projected customer satisfaction data associated with a geographic area serviced by the first network equipment, and
determining, based on the first demand data and the projected customer satisfaction data, a time at which a network resource upgrade, related to the first network equipment, is to be performed, wherein the determining that the first network equipment is operating in the period of non-linear signal degradation further comprises determining a degree of non-linear signal degradation associated with the first network equipment that exceeds a threshold.

2. The device of claim 1, wherein obtaining the projected customer satisfaction data is based on the degree of non-linear signal degradation.

3. The device of claim 2, wherein the operations further comprise, based on the degree of non-linear signal degradation, obtaining a projected degree of change in the projected customer satisfaction data that comprises an indication of a projected degree of non-linear change in the projected customer satisfaction data.

4. The device of claim 1, wherein the traffic information comprises traffic information reflective of a first interference characteristic associated with the first network equipment.

5. The device of claim 4, wherein the first interference characteristic comprises a signal to noise ratio associated with the first network equipment.

6. The device of claim 4, wherein the first interference characteristic comprises a first quantity of re-transmitted data packets by the first network equipment.

7. The device of claim 6, wherein the first quantity of re-transmitted data packets are re-transmitted due to interference via a network radio link between the first network equipment and the user equipment.

8. The device of claim 7, wherein the first quantity of re-transmitted data packets is reflective of a second quantity of physical resource blocks comprising time intervals in which the first quantity of re-transmitted data packets are to be transmitted via the network radio link.

9. The device of claim 6, wherein the first interference characteristic comprises a transmission link capacity associated with transmissions between the first network equipment and the user equipment.

10. The device of claim 1, wherein the traffic information comprises network utilization data related to the first network equipment.

11. A method, comprising:
selecting, by first network equipment comprising a processing system including a processor, second network equipment having a similar characteristic to the first network equipment according to a criterion applicable to similarity;
facilitating, by the first network equipment, based on traffic information associated with the first network equipment in the criterion applicable to the similarity, a determination that the second network equipment is operating in a period of non-linear signal degradation to a corresponding degree; and
communicating, by the first network equipment, to a resource upgrade predictor, the corresponding degree of non-linear signal degradation for a determination, by the resource upgrade predictor, of a time at which a network resource upgrade, related to the second network equipment, is to be performed, wherein the determination that the second network equipment is operating in the period of non-linear signal degradation to the corresponding degree further comprises determining that the corresponding degree of non-linear signal degradation associated with the second network equipment that exceeds a threshold.

12. The method of claim 11, wherein the traffic information comprises traffic information reflective of a signal to noise ratio associated with the first network equipment.

13. The method of claim 11, wherein the traffic information comprises traffic information reflective of a quantity of physical resource blocks comprising time intervals in which transmission data is to be transmitted via a radio link.

14. The method of claim 11, wherein the traffic information is based on utilization data of the first network equipment.

15. The method of claim 11, wherein the resource upgrade predictor is located within a network environment comprising the first network equipment.

16. A non-transitory machine-readable medium comprising executable instructions that, when executed by a processing system including a processor of a network device, facilitate performance of operations, comprising:
obtaining traffic information reflective of communication with a user equipment serviced by the network device;
based on the traffic information, determining that the network device is operating in a period of non-linear signal degradation;
based on the non-linear signal degradation of the period in which the network devices have been determined to be operating, obtaining projected user experience data associated with a geographic area serviced by the network device; and
determining, based on the traffic information and the projected user experience data, a time at which a network resource upgrade, related to the network device, is to be performed, wherein the determining that the network device is operating in the period of non-linear signal degradation further comprises determining a degree of non-linear signal degradation associated with the network device that exceeds a threshold.

17. The non-transitory machine-readable medium of claim 16, wherein the determining that the network device is operating in the period of the non-linear signal degradation further comprises determining a degree of non-linear signal degradation that exceeds a threshold.

18. The non-transitory machine-readable medium of claim 17, wherein obtaining the projected user experience data is based on the degree of non-linear signal degradation.

19. The non-transitory machine-readable medium of claim 17, wherein the operations further comprise, based on the degree of non-linear signal degradation, obtaining a projected degree of change in the projected user experience data that indicates a projected degree of non-linear change in the projected user experience data.

20. The non-transitory machine-readable medium of claim 16, wherein the traffic information comprises traffic information reflective of a first interference characteristic associated with the network device.

* * * * *